United States Patent [19]

Södler et al.

[11] 4,281,731
[45] Aug. 4, 1981

[54] ELECTROMAGNETIC FORCE-COMPENSATING PRECISION WEIGHER WITH DITHER

[75] Inventors: Walter Södler; Dieter Blawert, both of Göttingen; Jürgen Ober, Hardegsen, all of Fed. Rep. of Germany

[73] Assignee: Sartorius GmbH, Göttingen, Fed. Rep. of Germany

[21] Appl. No.: 148,013

[22] Filed: May 8, 1980

[30] Foreign Application Priority Data

May 12, 1979 [DE] Fed. Rep. of Germany ....... 2919227

[51] Int. Cl.³ .......................... G01G 7/00; G01G 3/08
[52] U.S. Cl. .................................... 177/212; 177/229; 177/DIG. 11
[58] Field of Search ............... 177/212, 229, 184, 189, 177/DIG. 11

[56] References Cited

U.S. PATENT DOCUMENTS

| 4,027,735 | 6/1977 | Floyd | 177/229 X |
| 4,170,269 | 10/1979 | Kunz | 177/212 X |

FOREIGN PATENT DOCUMENTS

505442 4/1978 U.S.S.R. .......................... 177/DIG. 11

Primary Examiner—George H. Miller, Jr.
Attorney, Agent, or Firm—Otto John Munz

[57] ABSTRACT

An electromagnetic force-compensating weigher with a load supporting device resiliently supported by resilient joints and movable between stops, wherein electric circuitry is connected to produce a slowly decaying mechanical oscillation upon the load supporting device, to thereby reduce the spring hysteresis of the resilient joints.

10 Claims, 3 Drawing Figures

ELECTROMAGNETIC FORCE-COMPENSATING PRECISION WEIGHER WITH DITHER

BACKGROUND OF THE INVENTION

Field of the Invention

The invention relates to an electromagnetic force-compensating precision weigher with a load picking-up device which is supported by means of metallic resilient joints and is vertically movable between stops.

Resilient joints of such weighers for high precision weighing must fulfill two contrary requirements:

On the one hand, the resilient joints must be of the greatest possible stability in order to permit a simple manufacture and assembly and to safely absorb forces occurring at an eccentric loading or at the transportation of the weigher. On the other hand, the resilient joints should be as thin as possible in order to keep their hysteresis errors, which even with the best resilient materials cannot entirely be avoided, as small as possible. The design of the resilient joints had then to be such that neither the stability was too strongly reduced nor the hysteresis errors became too conspicuous.

SUMMARY OF THE INVENTION

The invention aims thus at the development of an electromagnetic compensating precision weigher with resilient joints arranged in such a way that the indication error due to hysteresis of the resilient joints is substantially reduced, and that the stability of the resilient joints can be substantially increased while still maintaining a prespecified tolerable hysteresis error.

According to the invention, this aim is achieved by the provision of electric means which force upon the load picking-up device, for the purpose of reducing the hysteresis of the resilient joints, a slowly dying-out mechanical oscillation.

In this structure, the oscillation frequency ranges suitably between 1 and 10 Hz, and the dying-out time constant is such that the oscillation has died out after 0.5 to 5 seconds. The electric means for oscillation incitement are suitably constructed in such a way that the initial amplitude and the dying-out time constant of the oscillation are independent of the magnitude of the load. In an advantageous embodiment, the oscillation is forced upon the load picking-up device by the coil of the electromagnetic force compensation device. In a further development, the automatic control system of the electromagnetic force compensation is designed in such a way that at a load change the new rated value is reached by means of a slowly dying-out oscillation. The electric means for the incitement of the dying-out oscillation can be switched on manually or automatically. The automatic switching-on may advantageously take place when the deflection of the load picking-up device has exceeded a prespecified limiting value, or when in a weigher with enclosed weighing space the weighing space is closed, or when in a weigher with weight switching the setting of the weight switching is concluded.

The invention can be employed for any resilient joints, e.g., in diaphragm springs, torsion springs, wrapper springs, leaf springs, and flexible joint springs (see VDI Zeitschrift (periodical), vol. 83, No. 45 (1939), pp. 1189–1196) and can be employed in weighers with any arrangement of the resilient joints, such as beam balances, weighbridges, etc.

BRIEF DESCRIPTION OF THE DRAWINGS

Further advantages and features of the invention will become apparent from the drawings, wherein a parallel construction for an upper scale weigher is shown, for example, and in which.

DETAILED DESCRIPTION OF THE PREFERRED EMBODIMENT

Figure 1:
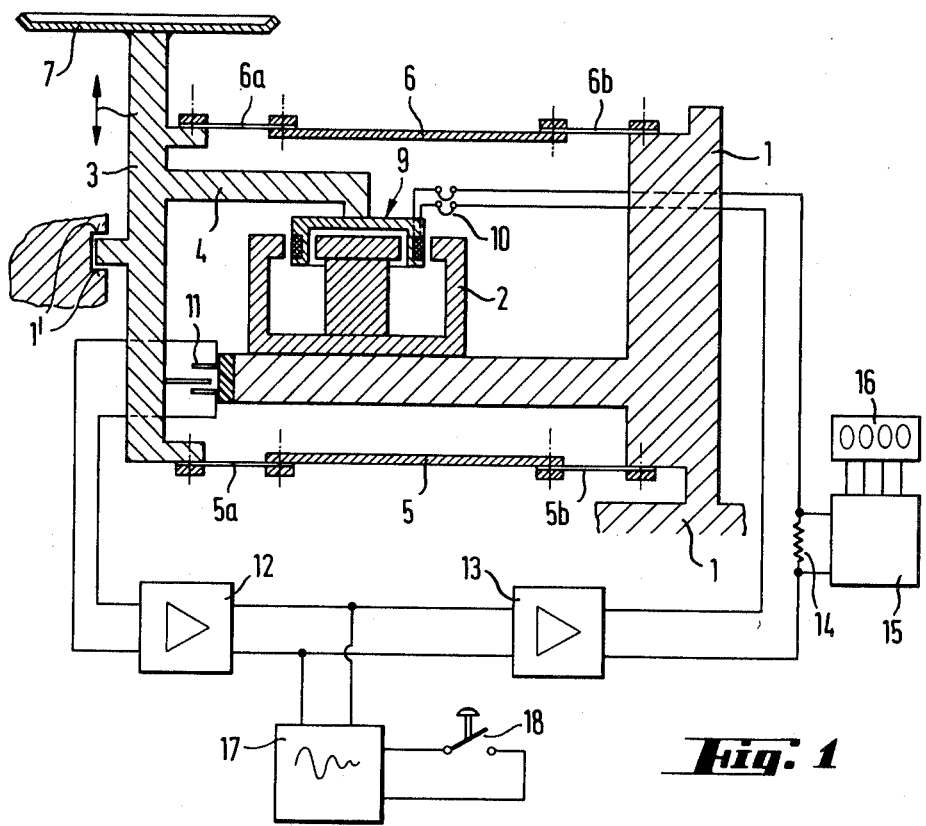
FIG. 1 is a diagrammatical view of a weigher with a resilient joint parallel construction (partially in section), showing the electronic system associated therewith for the electromagnetic force compensation, illustrated in block diagram.

The mechanical portion of the weigher in FIG. 1 consists of a load picking-up device 3 movable between stops 1', which supports a load scale 7 and which is connected via two guide rods 5 and 6 in the form of a parallel construction with the stationary part 1 of the weigher. In each case, leaf springs 5a, 5b, 6a, 6b are used as resilient joints, at the ends of guide rods 5 and 6. Load picking-up device 3 supports on a protruding arm 4 a coil 9 connected in reciprocal action to the field of a stationary permanent magnet 2.

The electric automatic control system for the electromagnetic force compensation consists of a position scanner 11 which scans the position of movable picking-up device 3, a preamplifier 12 and a power amplifier 13. The two together form the automatic volume control amplifier 13'. The output current of power amplifier 13 is fed to coil 9 via movable feed lines 10; simultaneously, a current-proportional measuring voltage can be picked off on a resistor 14 and can be digitized in an analog-digital converter 15 and be indicated in a digital indicator 16.

Furthermore, in the weigher of the invention, a circuit 17 is provided which, after actuation of a key 18 feeds a slowly dying-out alternating voltage to the automatic control system and thereby forces, via power amplifier 13 and coil 9, to the movable parts 3, 7 of the weigher a slowly dying-out oscillation. Thereby, resilient joints 5a, 5b, 6a, 6b are subjected to a bending strain with alternating sign and decreasing amplitude and can thus reduce the mechanical hysteresis errors.

The mechanical structure of such weighers with electromagnetic force compensation is known and explained in greater detail e.g. in U.S. Pat. No. 4,062,416, so that a detailed description here is unnecessary.

Figure 3:
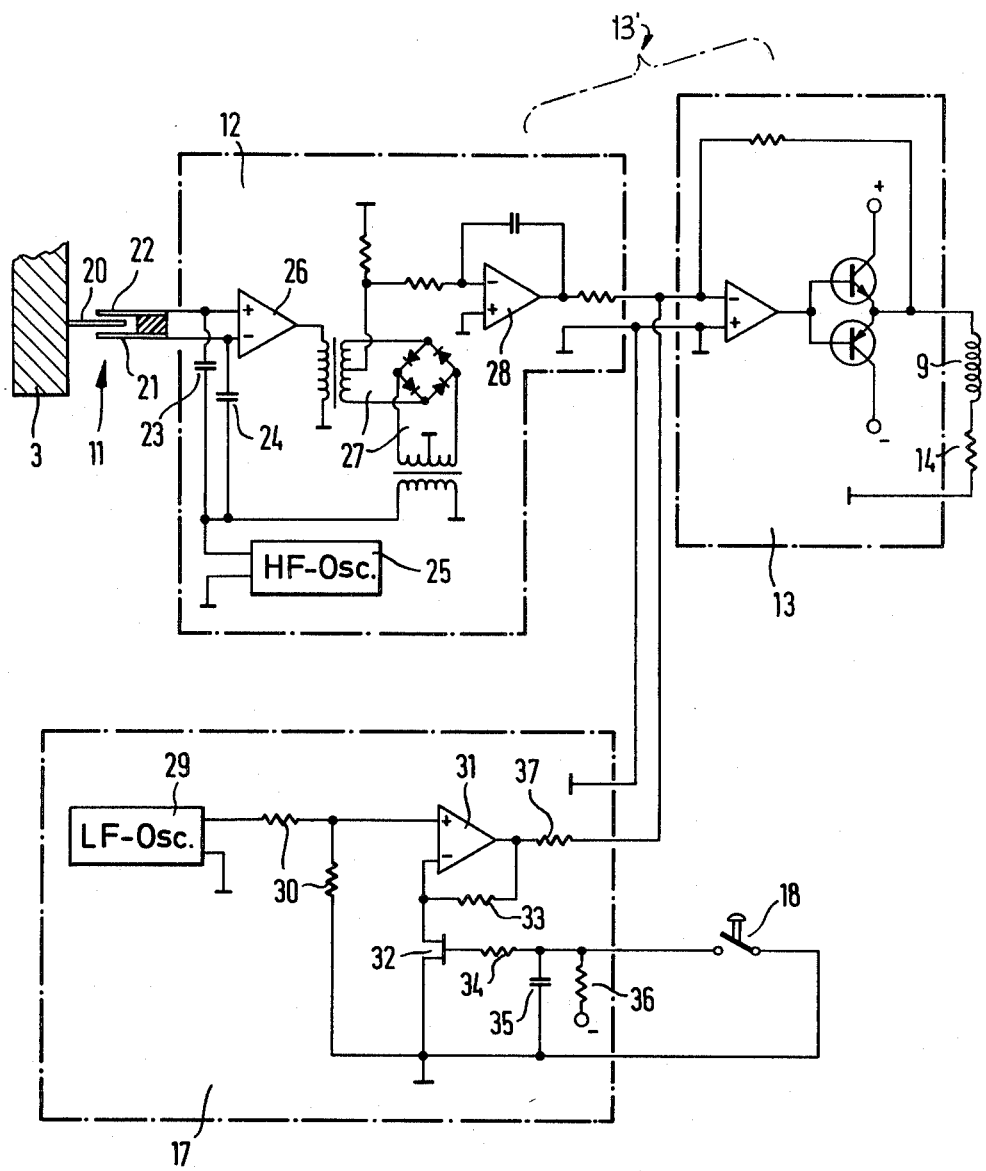
FIG. 3 is a detailed block or schematic circuit diagram of the electronic system.

The electronic mechanism, represented in FIG. 1 as block diagram only, is shown in greater detail in FIG. 3 and explained in the following:

An electrode 20 of position scanner 11 is fixed on movable load picking-up device 3 and conductively connected to the casing. The two other stationary electrodes 21 and 22 are connected via two identical condensers 23 and 24 to a high-frequency alternating voltage source 25 which has a frequency of e.g. 100 kHz. In the ideal position of the movable load picking-up device 3, electrode 20 is positioned in the center between the two electrodes 21 and 22, so that the sum-and-difference amplifier 26 receives the same alternating voltage amplitudes at its two inputs, and its output signal becomes zero. In the case of deviations from the ideal position, the two alternating voltage amplitudes at the input of sum-and-difference amplifier 26 are not the same; the resulting output alternating voltage of sum-and-difference amplifier 26 is, in a known manner, rectified via a ring demodulator 27 in a phase-sensitive manner. The resulting direct voltage is fed to an integrator 28 which via power amplifier 13 increases or decreases, respectively, the current through coil 9 until load picking-up device 3 reaches its ideal position.

Furthermore, in a low-frequency alternating voltage source 29 an alternating voltage of a frequency of 1 ... 10 Hz is generated. Of course, this low-frequency alternating voltage can also be derived from the high-frequency alternating voltage source 25 or from an impulse generator in the analog/digital converter 15 via a frequency divider. This low-frequency alternating voltage is fed via a voltage divider 30 to the input of an amplifier 31 whose amplification factor can be modified by means of a field effect transistor 32 in the feedback. Corresponding to the voltage at the control electrode of field effect transistor 32, the latter changes its resistance, so that the voltage division ratio of the voltage divider which consists of resistor 33 and field effect transistor 32, changes accordingly. The control electrode of field effect transistor 32 is connected, via a high impedance resistor 34 to a condenser 35, which is kept normally through resistor 36 at a negative potential. In this state, field effect transistor 32 is highly resistant, so that amplifier 31 is given an amplification factor of only a little above one. Therefore, only a very small alternating voltage reaches the input of power amplifier 13 via resistor 37. This very low alternating voltage is swamped in the control variations of the automatic-control amplifier. When, then, a key 18 is actuated for a short period of time, condenser 35 is discharged, and the control voltage on the field effect transistor 32 drops to zero. In this state the field effect transistor is of low ohmic resistance, so that amplifier 31 receives an amplification factor of about 1000 and feeds an alternating voltage via resistor 37 to the input of power amplifier 13. The alternating current thus generated by coil 9 forces upon load picking-up device 3 a corresponding low-frequency oscillation whose amplitude amounts to about 0.2 mm. Since condenser 35, after the release of key 18, is gradually recharged via resistor 36 to a negative potential, the amplification of amplifier 31 drops gradually and correspondingly also the low-frequency alternating current in coil 9, so that the mechanical oscillation of load picking-up device 3 slowly dies out. The time constant of this dying-out process is chosen in such a way that the oscillation has died out after 0.5 to 5 seconds.

In another development, circuit 17 may be integrated in preamplifier 12 or power amplifier 13 in such a manner that slowly dying-out oscillations at a load change of the control circuit 11, 12, 13, 9 are generated, so that the movable load picking-up device 3 reaches its final position via a slowly dying-out oscillation.

Figure 2:
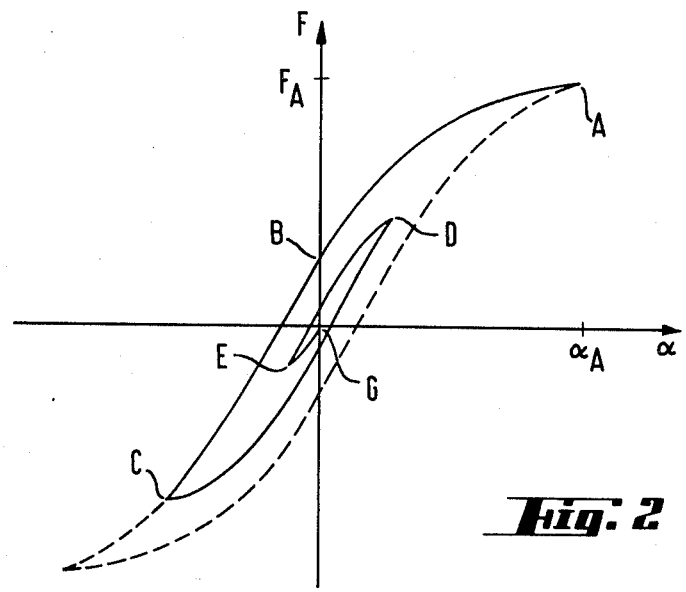
FIG. 2 is a diagrammatical, enlarged view showing the hysteresis loop of resilient joints.

The effect of this oscillation with decreasing amplitude upon the hysteresis is explained in FIG. 2. The hysteresis loop drawn in dash lines shows for resilient joints the dependency of the spring force F on bending angle $\alpha$. In this drawing, the hysteresis is, for the sake of clarity, shown much larger than it actually is. When the resilient joint is deflected to the angle $\alpha_A$, the force necessary therefor is $F_A$ (point A). When the resilient joint is subsequently returned to its position of rest at $\alpha=0$ (point B), a final force effect of the resilient joint remains which falsifies the indication of the weigher. If, then, according to the invention the resilient joint is subjected to a dying-out oscillation, the further points C, D, E and G in FIG. 2 are passed through, so that in the position of rest ($\alpha=0$) practically no power effect of the resilient joint remains (point G).

Key 18 can, in a weigher with enclosed weighing space, e.g. be arranged in such a way that in the closing of the weighing space, circuit 17 is activated. In a weigher with weight switching, key 18 may also be arranged in such a way that, after each fresh setting of the weight switching, circuit 17 is activated. On the other hand, key 18 may also be replaced by an electronic switch which responds when a prespecified voltage at the output of position scanner 11 is exceeded, i.e., when a prespecified deflection of the movable connection element 3 is exceeded.

What we claim as new and desire to secure by United States Letters Patent is:

1. An electromagnetic force-compensating precision weigher, comprising:
   a load picking-up device supported by means of metallic resilient joints and vertically movable between stops; and
   electric means connected with the load picking-up device imposing a slowly dying-out mechanical oscillation upon the load picking-up device and reducing the spring hysteresis of the resilient joints.

2. A precision weigher as in claim 1, wherein:
   the weigher includes an electromagnetic force compensation coil; and
   the oscillation is forced upon the load picking-up device by the coil of the electromagnetic force compensation.

3. A precision weigher as in one of claims 1 or 2, wherein:
   the electric means includes an automatic control circuit, connected with the electromagnetic force compensation coil in such a way that at a load change a new rated value is reached by means of a slowly dying-out oscillation.

4. A precision weigher as in one of claims 1 or 2, wherein:
   the electric means are structured in such a way that the initial amplitude and the dying-out time constant of the oscillation are independent of the magnitude of the load.

5. A precision weigher as in one of claims 1 or 2, wherein:
   the oscillation frequency ranges between 1 and 10 Hz.

6. A precision weigher as in one of claims 1 or 2, wherein:
   the dying-out time constant of the oscillation is chosen in such a way that the oscillation has died out after 0.5 to 5 seconds.

7. A precision weigher as in one of claims 1 or 2, wherein:
   a manually operated key is connected for switching on the electric means.

8. A precision weigher as in one of claims 1 or 2, wherein:
   the electric means includes an automatic control circuit connected with the electric means for switching the electric means on automatically when the deflection of the load picking-up device has exceeded a prespecified limiting value.

9. A precision weigher as in one of claims 1 or 2, wherein:
   the weigher has an enclosed weighing space; and the electric means are automatically switched on when the weighing space is closed.

10. A precision weigher as in one of claims 1 or 2, wherein:

the weigher includes weight switching; and
the electric means are automatically switched on after the conclusion of the setting of the weight switching.

* * * * *